United States Patent [19]

Wang

[11] Patent Number: 5,555,302
[45] Date of Patent: Sep. 10, 1996

[54] MOBILE TELEPHONE HOLDER

[76] Inventor: Chin-Yang Wang, No. 167, Lane 131, Sec. 2, Ture Hsing Rd., Panchiao City Taipei Hsien, Taiwan

[21] Appl. No.: 503,591

[22] Filed: Jul. 18, 1995

[51] Int. Cl.⁶ .................................................. H04M 1/00
[52] U.S. Cl. .......................... 379/446; 379/454; 379/455; 379/426
[58] Field of Search ..................... 379/446, 426, 379/454, 455, 449; 455/89, 90, 128; 248/316.4, 231.4

[56] References Cited

U.S. PATENT DOCUMENTS 5,305,381  4/1994  Wang ......................................... 379/455

*Primary Examiner*—Krista M. Zele
*Assistant Examiner*—Jack Chiang
*Attorney, Agent, or Firm*—Bucknam and Archer

[57] ABSTRACT

A mobile telephone holder including a base plate covered with a back cover, two clamping plates coupled to the base plate at two opposite sides and having a respective rack, a rotating gear mounted inside the base plate and meshed between the racks on the clamping plates, a locating gear coupled to the gear shaft of the rotating gear, a sliding switch mounted on said base plate at one end, a stop rod controlled by the sliding switch to stop the locating gear in locking the clamping plates in position.

2 Claims, 4 Drawing Sheets

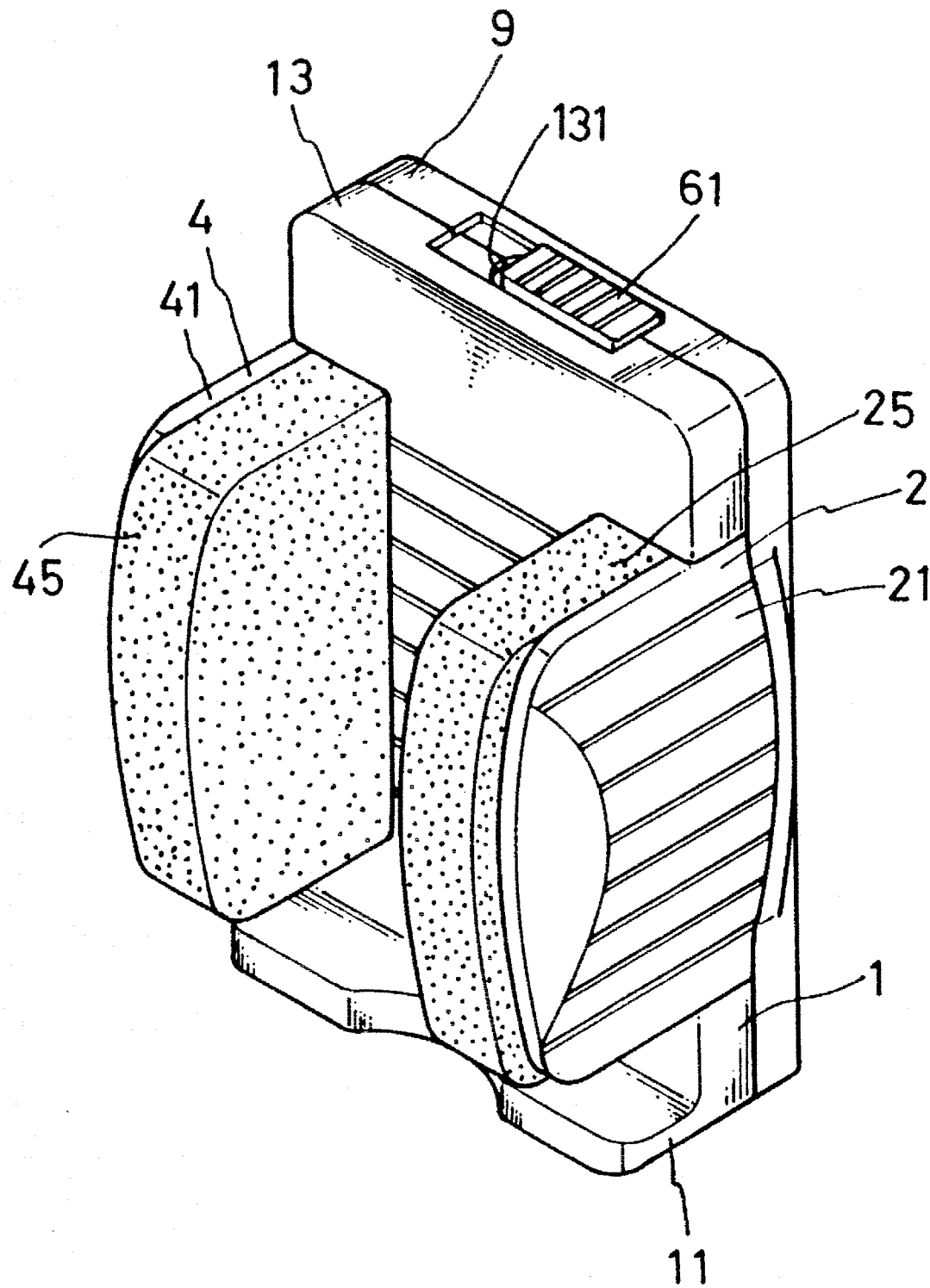
F I G. 2

MOBILE TELEPHONE HOLDER

BACKGROUND OF THE INVENTION

The present invention relates to mobile telephone holders, and relates more particularly to such a mobile telephone holder which uses a sliding switch to control the adjustment of the pitch between two opposite clamping plates.

A variety of mobile telephone holders have been disclosed for carrying a mobile telephone, and have appeared on the market. These mobile telephone holders are commonly designed for holding a particular model of mobile telephone. There is also known an adjustable mobile telephone holder which includes two opposite clamping plates that can be moved relative to each other. When in use, the clamping plates are moved apart. After the mobile telephone is loaded, the clamping plates are moved toward each other to hold down the mobile telephone. The drawback of this structure of mobile telephone holder is that the clamping plates must be moved when the mobile telephone is loaded or unloaded.

SUMMARY OF THE INVENTION

The mobile telephone holder according to the preferred embodiment of the present invention comprises a base plate covered with a back cover, two clamping plates coupled to the base plate at two opposite sides and having a respective rack, a rotating gear mounted inside the base plate and meshed between the racks on the clamping plates, a locating gear coupled to the gear shaft of the rotating gear, a sliding switch mounted on said base plate at one end, a stop rod controlled by the sliding switch to stop the locating gear in locking the clamping plates in position. By moving the sliding switch in one direction, the stop rod is forced into engagement with the locating gear, causing the clamping plates stopped in position. On the contrary, when the sliding switch is moved in the reversed direction, the stop rod is released from the locating gear, permitting the clamping plates to be moved relative to each other.

BRIEF DESCRIPTION OF THE DRAWINGS

FIG. 2 is an elevational view of the mobile telephone holder shown in FIG. 1;

DETAILED DESCRIPTION OF THE PREFERRED EMBODIMENT

Figure 1:
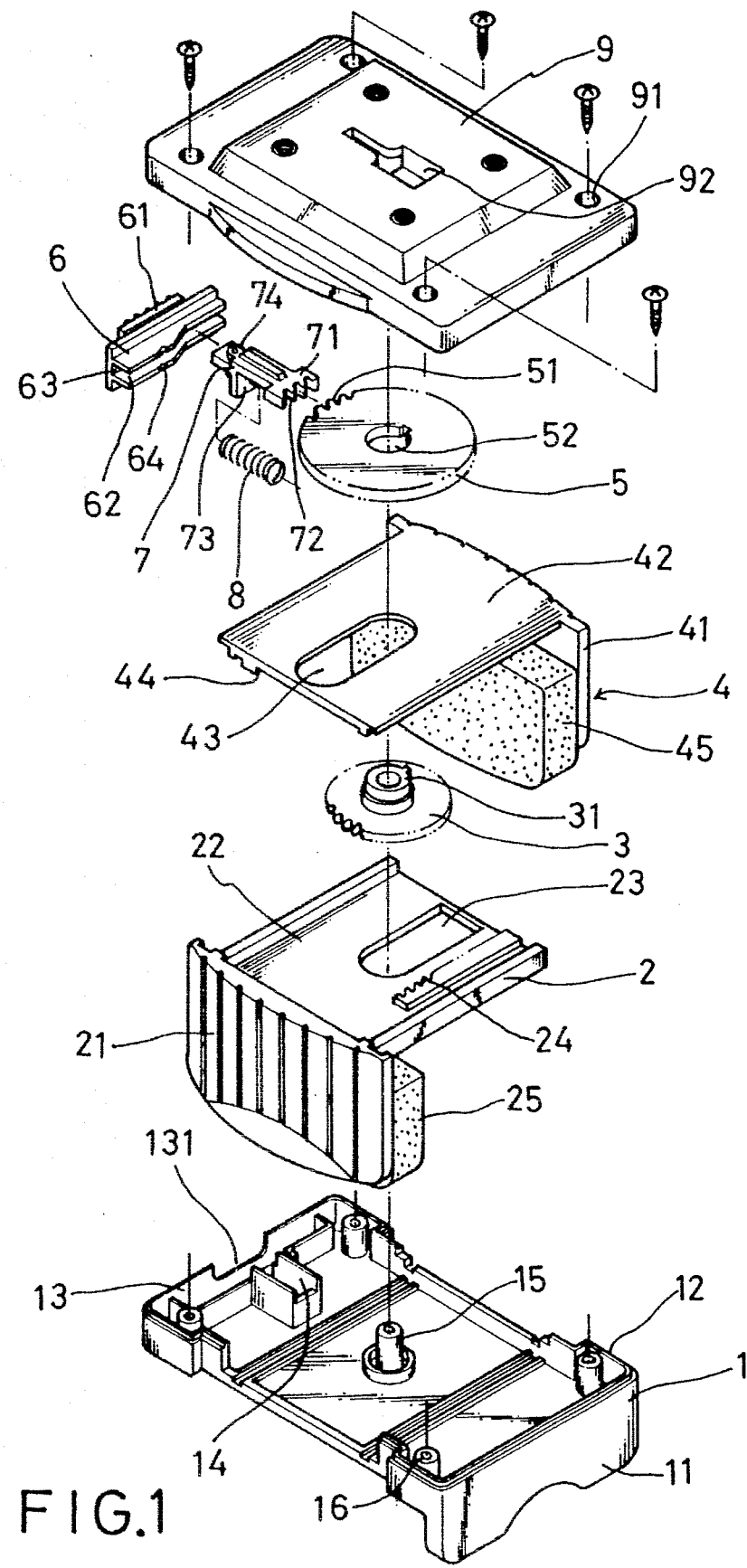
FIG. 1 is an exploded view of a mobile telephone holder according to the present invention.
Figure 3:
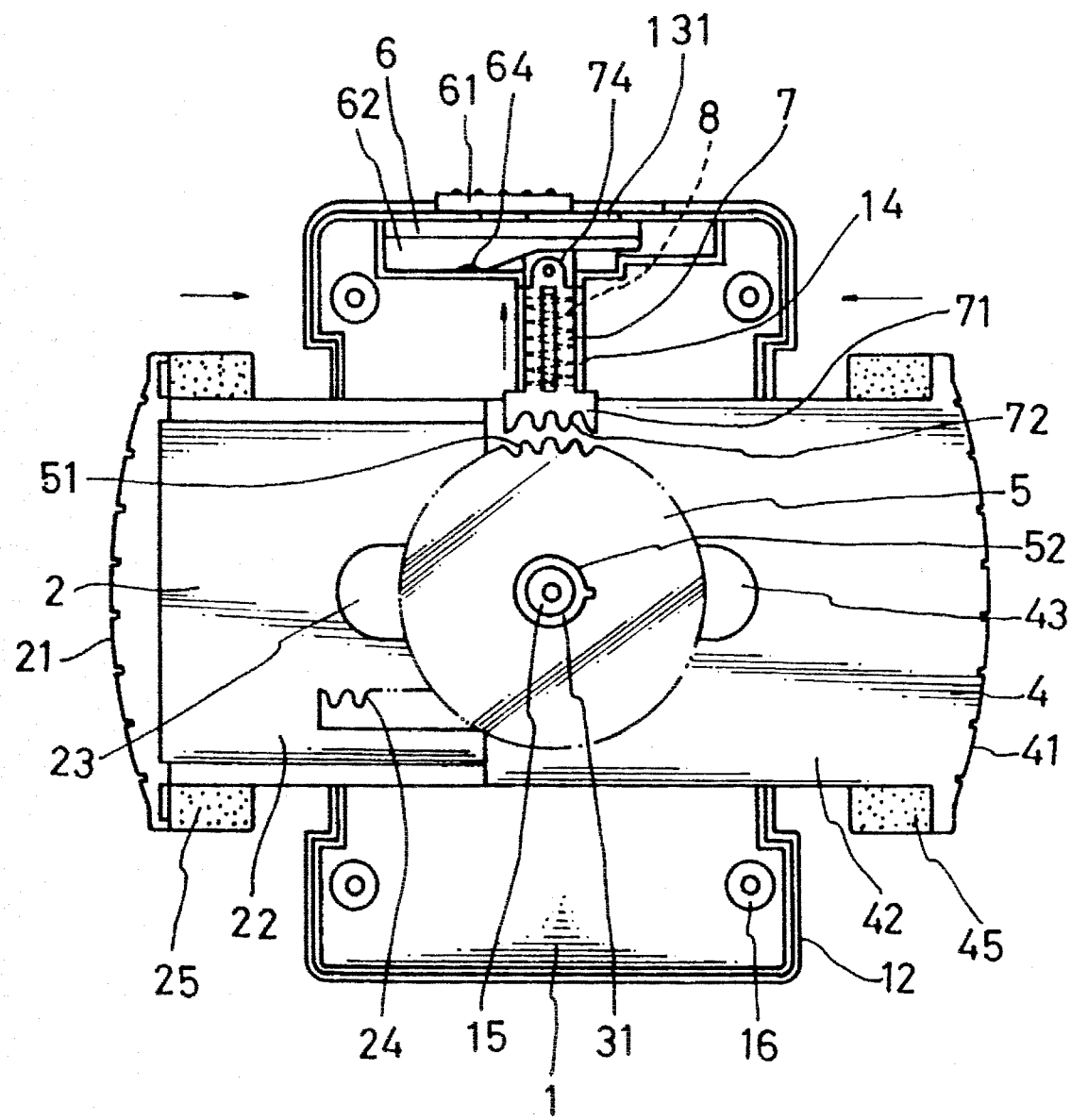
FIG. 3 is bottom view in section showing the clamping plates moved relative to each other.

Referring to FIGS. 1, 2, and 3, a mobile telephone holder in accordance with the present invention is generally comprised of a base plate 1, a first clamping plate 2, a rotating gear 3, a second clamping plate 4, a locating gear 5, a sliding switch 6, a stop rod 7, a spring 8, and a back cover 9. The base plate 1 comprises an upward top flange 11 at one end for stopping the mobile telephone upon its loading on the face plate 1, a downward flange 12 around the border, a transverse bottom chamber 13 at an opposite end for holding the sliding switch 6, a longitudinal bottom chamber 14 perpendicularly extended from the transverse bottom chamber 13 for holding the stop rod 7, a sliding notch 131 on the downward flange 12 in communication with the transverse bottom chamber 13, a female screw rod 15 raised from the center at the bottom, and a plurality of bottom posts 16 for mounting the back cover 9. The first clamping plate 2 comprises a vertical clamping wall 21, a horizontal mounting wall 22 extended from the vertical clamping wall 21 at right angles, a longitudinal sliding slot 23 on the horizontal mounting wall 22, a rack 24 on the horizontal mounting wall 22 at the back side along one side of the sliding slot 23 and a cushion 25 fixedly secured to the vertical clamping wall 21 at an inner side. The second clamping plate 4 comprises a vertical clamping wall 41, a horizontal mounting wall 42 extended from the vertical clamping wall 41 at right angles, a longitudinal sliding slot 43 on the horizontal mounting wall 42, a rack 44 on the horizontal mounting wall 42 at the back side along one side of the sliding slot 43, and a cushion 45 fixedly secured to the vertical clamping wall 41 at an inner side. The rotating gear 3 is meshed between the rack 24 on the first clamping plate 2 and the rack 44 on the second clamping plate 4, having a hollow gear shaft 31 at the center mounted around the female screw rod 15. The locating gear 5 has a center mounting hole 52 coupled to the hollow gear shaft 31 of the rotating gear 3, having a plurality of teeth 51 around the periphery. The sliding switch 6 comprises a head 61 extended out of the downward flange 12 through the sliding notch 131, two parallel ribs 62 disposed inside the transverse bottom chamber 13, a mounting groove 63 defined between the ribs 62 for holding the stop rod 7, and a curved projecting portion 64 inside the mounting groove 63. The stop rod 7 is mounted inside the longitudinal bottom chamber 14 on the base plate 1, having a head 71 with teeth 72 for engagement with the teeth 51 of the locating gear 5, a downward stop flange 73 for stopping one end of the spring 8, and a raised actuating portion 74 acted against the curved projecting portion 64 on the sliding switch 6. The spring 8 is mounted inside the longitudinal bottom chamber 14 and stopped between the downward stop flange 73 of the stop rod 7 and the periphery of the longitudinal bottom chamber 14 to force the stop rod 7 outward from the locating gear 5. The back cover 9 is covered on the downward flange 12 of the base plate 1, having a plurality of mounting holes 91 respectively fastened to the bottom posts 16 on the base plate 1 by screws, and a hanging hole 92 for hanging.

Figure 4:
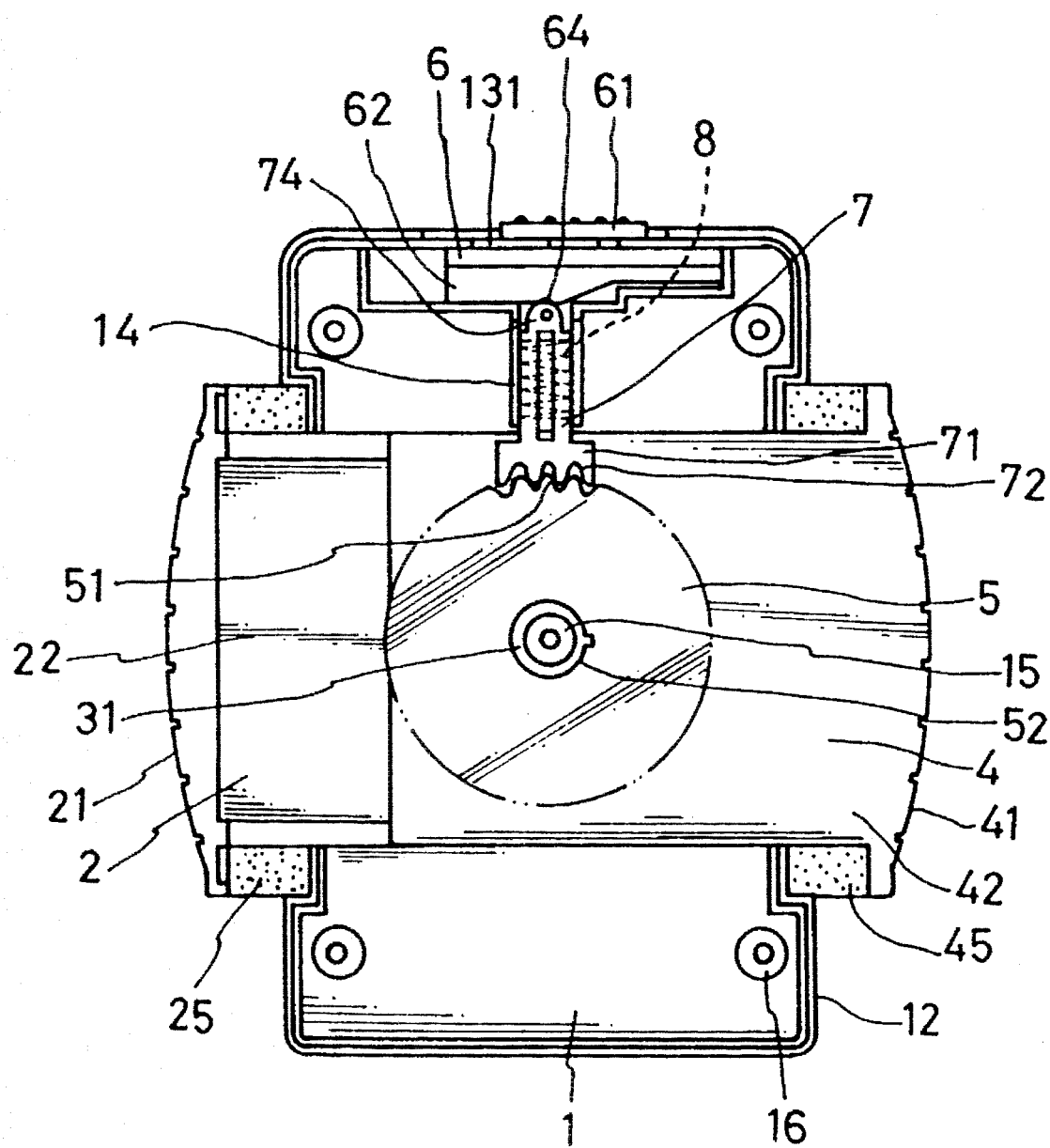
FIG. 4 is similar to FIG. 3 but shown the clamping plates fixed.

Referring to FIG. 5 and FIG. 4 again, when the stop rod 7 and the spring 8 are installed in the longitudinal bottom chamber 14 and the sliding switch 6 is installed in the transverse bottom chamber 13, the female screw rod 15 of the base plate 1 is inserted in proper order through the sliding slot 23 on the first clamping plate 2, the hollow gear shaft 31 of the rotating gear 3, the sliding slot 43 on the second clamping plate 4, and the center mounting hole 52 on the locating gear 5. When the back cover 9 is fixed to the base plate 1, the rotating gear 3 is meshed between the rack 24 on the first clamping plate 2 and the rack 44 on the second clamping plate 4, the raised actuating portion 74 of the stop plate 7 is inserted into the mounting groove 63 on the sliding switch 6 and disposed in contact with the curved projecting portion 64. When the head 61 of the sliding switch 6 is moved leftward, the stop rod 7 is released from the sliding switch 6 and forced outwards from the locating gear 5 by the spring 8, therefore, the first clamping plate 2 and the second clamping plate 4 can be moved relative to each other through the engagement between the racks 24 and 44 and the rotating gear 3. When the sliding switch 6 is moved rightward, the stop rod 7 is forced by the curved projecting portion 64 into engagement with the locating gear 5, and therefore the first clamping plate 2 and the second clamping plate 4 are locked in position.

It is to be understood that the drawings are designed for purposes of illustration only, and are not intended as a definition of the limits and scope of the invention disclosed.

I claim:

1. A mobile telephone holder comprising:

a base plate having a front end, a rear end, an upward top flange raised from said rear end, a downward bottom flange around the border, a transverse bottom chamber adjacent to said front end, a longitudinal bottom chamber perpendicularly extended from said transverse bottom chamber, a sliding notch on said downward flange in communication with said transverse bottom chamber, a bottom female screw rod equally spaced between said front end and said rear end, and a plurality of bottom posts around the border;

a back cover covered on the downward bottom flange over said base plate, having plurality of mounting holes respectively fastened to the bottom posts of said base plate by screws, and a hanging hole for hanging;

a first clamping plate movably coupled to said base plate and said back cover at one side, said first clamping plate comprising a vertical clamping wall extended out of said base plate and said cover plate, a horizontal mounting wall extended from the vertical clamping wall of said first clamping plate at right angles and moved in and out of a hole defined between said base plate and said back cover at one side, a longitudinal sliding slot coupled to the bottom female screw rod on said base plate, a rack on the horizontal mounting wall of said first clamping plate along one side of the longitudinal sliding slot on said first clamping plate;

a second clamping plate movably coupled to said base plate and said back cover at an opposite side, said second clamping plate comprising a vertical clamping wall extended out of said base plate and said cover plate, a horizontal mounting wall extended from the vertical clamping wall of said second clamping plate at right angles and moved in and out of a hole defined between said base plate and said back cover at an opposite side, a longitudinal sliding slot coupled to the bottom female screw rod on said base plate, a rack on the horizontal mounting wall of said second clamping plate along one side of the longitudinal sliding slot on said second clamping plate;

a rotating gear meshed between the rack on said first clamping plate and the rack on said second clamping plate, having a hollow gear shaft at the center mounted around the bottom female screw rod of said base plate;

a locating gear mounted around the hollow gear shaft of said rotating gear;

a sliding switch mounted in the transverse bottom chamber on said base plate, said sliding switch comprising a head extended out of the sliding notch on the downward flange of said base plate, two parallel ribs disposed inside said transverse bottom chamber, a mounting groove defined between said ribs, and a curved projecting portion disposed inside said mounting groove;

a stop rod mounted within said longitudinal bottom chamber on said base plate and moved by said sliding switch to stop said locating gear and said rotating gear from rotation, said stop rod having a toothed head for engagement with said locating gear, a downward stop flange, and a raised actuating portion stopped at the curved projecting portion of said sliding switch; and a spring mounted inside said longitudinal bottom chamber and stopped between the downward stop flange of said stop rod and the periphery of said longitudinal bottom chamber;

wherein when said sliding switch is moved in one direction, the toothed head of said stop rod is forced into engagement with said locating gear, causing said first clamping plate and said second clamping plate stopped in position; when said sliding switch is moved in the reversed direction, the toothed head of said stop rod is forced away from said locating gear by said spring, permitting said first clamping plate and said second clamping plate to be moved relative to each other.

2. The mobile telephone holder of claim 1 further comprises two cushions respectively fixed to the vertical clamping walls of said first clamping plate and said second clamping plate at an inner side.

* * * * *